United States Patent
Kusano et al.

[11] Patent Number: 5,446,351
[45] Date of Patent: Aug. 29, 1995

[54] FALSE-CREEP GENERATING DEVICE FOR ELECTRIC VEHICLES

[75] Inventors: Katsuyuki Kusano; Akira Ozawa; Yasushi Kanai, all of Saitama; Tomoyuki Itoh, Tokyo, all of Japan

[73] Assignee: Honda Giken Kogyo Kabushiki Kaisha, Tokyo, Japan

[21] Appl. No.: 111,528

[22] Filed: Aug. 25, 1993

[30] Foreign Application Priority Data

Aug. 26, 1992 [JP] Japan .................................. 4-250759

[51] Int. Cl.⁶ .......................... B60K 31/02; H02P 7/00
[52] U.S. Cl. ..................................... 318/139; 180/170; 364/426.04
[58] Field of Search ........................ 318/587, 139, 567; 180/170, 178, 179, 282, 65.6, 65.7, 65.8, 76; 364/424.1, 426.04

[56] References Cited

U.S. PATENT DOCUMENTS

| | | |
|---|---|---|
| 4,549,121 | 10/1985 | Gale . |
| 4,928,227 | 5/1990 | Burba et al. . |
| 5,234,071 | 8/1993 | Kajiwara .............................. 180/169 |
| 5,376,869 | 12/1994 | Konard ................................ 318/587 |

FOREIGN PATENT DOCUMENTS 0175982 4/1986 European Pat. Off. .
0457594 11/1991 European Pat. Off. .

OTHER PUBLICATIONS

Communication from European Patent Office Patent Abstract JP 60093174 (English language), May, 1985.

*Primary Examiner*—Bentsu Ro
*Attorney, Agent, or Firm*—Lyon & Lyon

[57] ABSTRACT

A false-creep generator device for an electric vehicle equipped with a transmission controls an electric motor to cause the electric vehicle to creep when the accelerator pedal of the electric vehicle is not depressed, no brake is applied to the electric vehicle, the transmission is in a drive or reverse position, and the speed of travel of the electric vehicle is lower than a predetermined creep speed.

8 Claims, 2 Drawing Sheets

FALSE-CREEP GENERATING DEVICE FOR ELECTRIC VEHICLES

BACKGROUND OF THE INVENTION

1. Field of the Invention

The present invention relates to a device for generating false creep for an electric vehicle.

2. Description of the Relevant Art

Automatic transmissions for motor vehicles usually have a drive (D) position, a parking (P) position, a neutral (N) position, and a reverse (R) position which can be selected one at a time by a shift lever.

If the automatic transmission of a motor vehicle that is propelled by an internal combustion engine is not in the P or N position, then the motor vehicle creeps because of small torque even when the accelerator pedal is not depressed. Such creeping allows the driver to maneuver the motor vehicle quite easily particularly when the driver wants to put the motor vehicle into a garage or pull over to park the motor vehicle.

Some conventional electric vehicles propelled by electric motors powered by batteries are also equipped with such an automatic transmission having D, P, N, and R positions. When the accelerator pedal of such an electric vehicle is not depressed, the torque command to be applied to the electric motor is of a zero value to save the electric energy stored in the battery. Therefore, no small torque is produced and no creeping occurs when the accelerator pedal is not depressed with the transmission in the D position. Therefore, drivers who are used to automatic transmissions on motor vehicles propelled by internal combustion engines find it somewhat awkward to maneuver electric vehicles especially at very low speed.

SUMMARY OF THE INVENTION

It is therefore an object of the present invention to provide a false-creep generating device which allows an electric vehicle to creep so that the electric vehicle can be maneuvered with ease especially at very low speed.

According to the present invention, there is provided a device for generating false creep for an electric vehicle equipped with a transmission, comprising an electric motor for propelling the electric vehicle, drive control means for converting a DC voltage from a battery to control the electric motor, shift position detecting means for detecting whether the transmission is in a shift position to move the electric vehicle, a controller for applying a control signal to the drive control means when the transmission is in the shift position to move the electric vehicle, accelerator operation detecting means for detecting whether the accelerator pedal of the electric vehicle is depressed or not, vehicle speed detecting means for detecting the speed of travel of the electric vehicle, brake operation detecting means for detecting whether the brake is being applied to the electric vehicle or not, and torque command means for outputting a low torque command value to the drive control means when the accelerator pedal is not depressed, the brake is not applied, the transmission is in the shift position to move the electric vehicle, and the speed of travel of the electric vehicle is lower than a predetermined creep speed.

According to the present invention, there is also provided a device for generating false creep for an electric vehicle equipped with a transmission, comprising an electric motor for propelling the electric vehicle, shift position detecting means for detecting whether the transmission is in a shift position to move the electric vehicle, accelerator operation detecting means for detecting whether the accelerator pedal of the electric vehicle is depressed or not, vehicle speed detecting means for detecting the speed of travel of the electric vehicle, brake operation detecting means for detecting whether the brake is being applied to the electric vehicle or not, and control means for outputting a relatively low current to the electric motor when the accelerator pedal is not depressed, the brake is not applied, the transmission is in the shift position to move the electric vehicle, and the speed of travel of the electric vehicle is lower than a predetermined creep speed.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
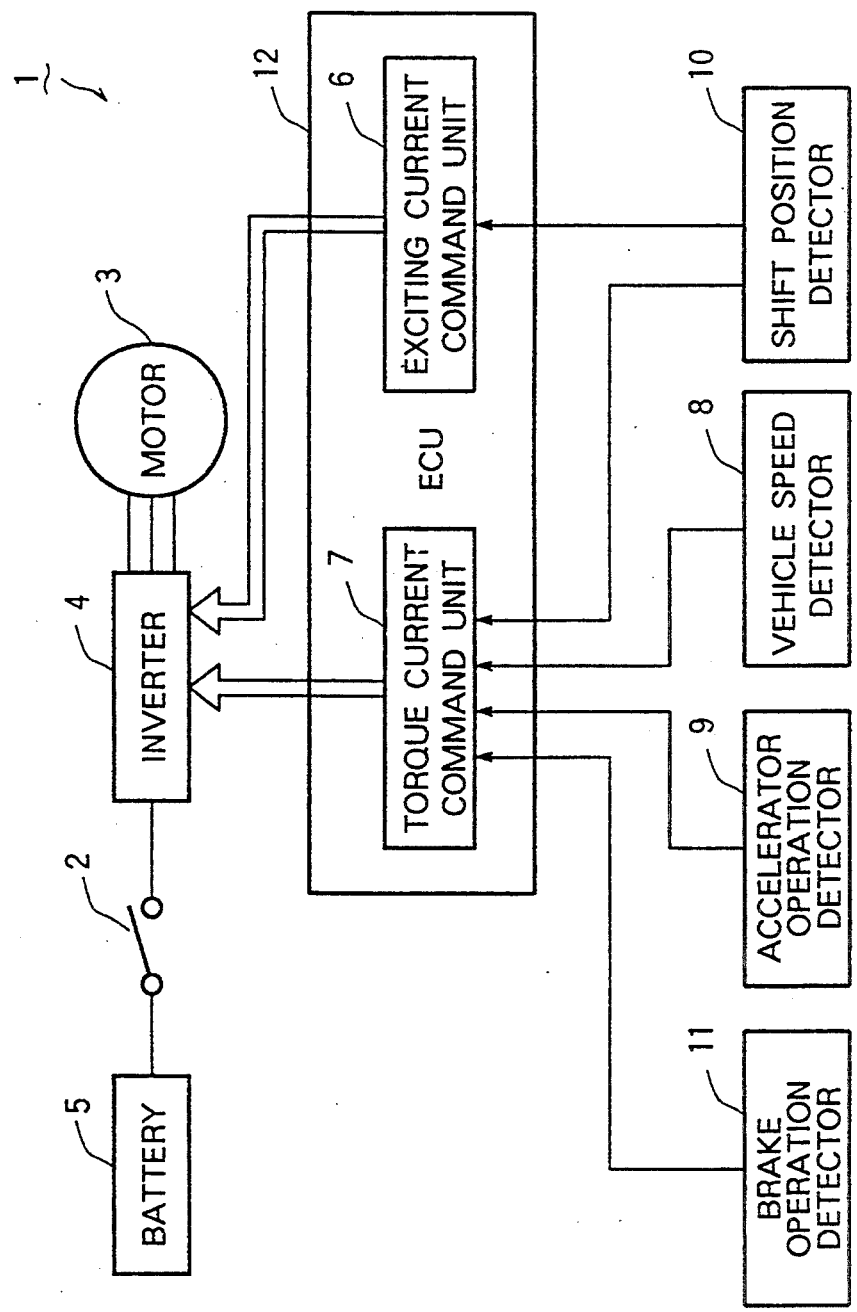
FIG. 1 is a block diagram of a false-creep generating device for an electric vehicle according to the present invention.

As shown in FIG. 1, a false-creep generating device for an electric vehicle according to the present invention comprises a starter switch 2, an electric motor 3, an inverter or drive control means 4, a battery 5, an exciting current command unit or controller 6, a torque current command unit 7, a vehicle speed detector 8, an accelerator operation detector 9, a shift position detector 10, and a brake operation detector 11.

The electric motor 3 is connected through the switch 2 and the inverter 4 to the battery 5 which applies a DC voltage of 200 volts, for example. Therefore, the electric motor 3 is energized by the electric energy stored in the battery 5.

The inverter 4 converts the DC voltage from the battery 5 into a three-phase AC voltage, and applies three-phase AC voltage to the electric motor 3. The inverter 4 is connected to the exciting current command unit 6 and the torque current command unit 7, and is supplied with at least one of an exciting current that is in phase with the magnetic flux generated in the electric motor 3 and a torque current that is 90° out of phase with the magnetic flux generated in the electric motor 3. The inverter 4 is controlled in a vector control process based on the supplied currents.

In the vector control process, the product of the exciting current and the torque current represents the torque produced by the electric motor 3. Usually, while the exciting current is kept at a constant value, the torque current is controlled so as to correspond to the force with which the accelerator pedal of the electric vehicle is depressed.

The electric motor 3 comprises a three-phase AC induction motor, for example.

The exciting current command unit 6 is connected to the shift position detector 10, and produces an exciting current command value based on supplied information representing the selected position of an automatic transmission on the electric vehicle. The torque current command unit 7 is connected to the vehicle speed detector 8, the accelerator operation detector 9, the shift position detector 10, and the brake operation detector 11, and produces a torque current command value based on supplied information representative of the present vehicle speed, the present stroke by which the accelerator pedal is depressed, the present position of the transmission, and whether the brake of the electric vehicle is applied or not. The exciting current command unit 6 and the torque current command unit 7 jointly serve as an electronic control unit (ECU) 12.

The electronic control unit 12 determines exciting and torque current command values and applies the determined exciting and torque current command values to the inverter 4 according to a control sequence (described later on).

Based on the supplied exciting and torque current command values, the inverter 4 converts the DC voltage from the battery 5 into a three-phase AC voltage, and applies the three-phase AC voltage to energize the electric motor 3. The electric motor 3 rotates road wheels (not shown) of the electric vehicle through the transmission and associated components.

Figure 2:
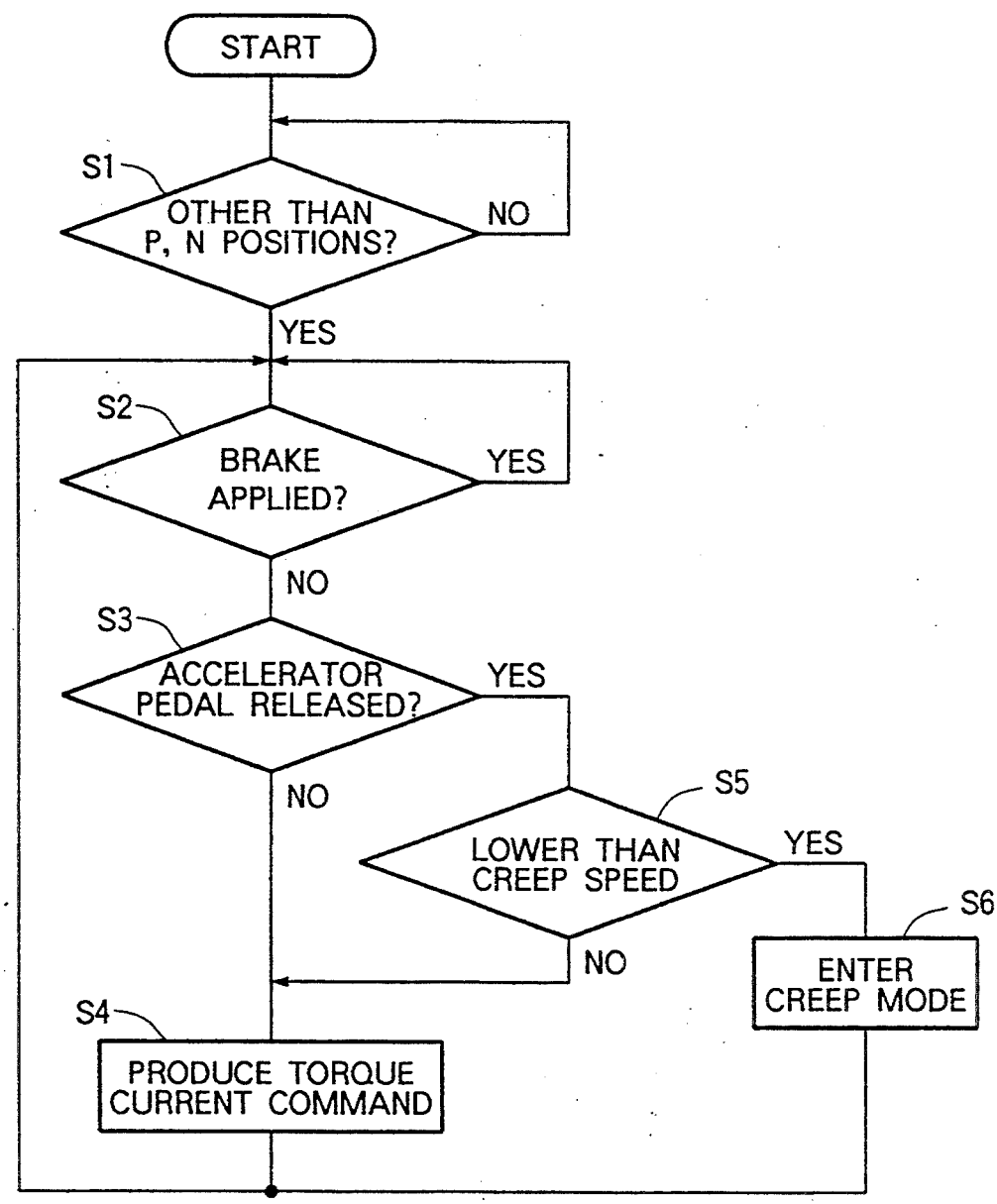
FIG. 2 is a flowchart of a control sequence of an electric control unit of the false-creep generating device.

FIG. 2 shows a control sequence of the ECU 12.

After the control sequence has started, the exciting current command unit 6 and the torque current command unit 7 receive a detected shift position from the shift position detector 10, and determines whether the detected shift position is other than the P and N positions or not in a step S1.

If the detected shift position is not other than P and N positions, then the step S1 is repeated. If the detected shift position is other than P and N positions, e.g., the D position, then the exciting current command unit 6 controls the exciting current to be of a predetermined command value.

The torque current command unit 7 determines whether the brake is applied or not based on a detected signal from the brake operation detector 11 in a step S2.

If the brake is applied, then the step S2 is repeated. At this time, the exciting current command value is set to zero. Therefore, no current is supplied from the inverter 4 to the electric motor 3, and hence no electric energy is supplied from the battery 5 to the electric motor 3.

If the brake is not applied, then the torque current command unit 7 determines whether the accelerator pedal is released or not based on a detected signal from the accelerator operation detector 9 in a step S3.

If the accelerator pedal is depressed, then the torque current command unit 7 produces a torque current command depending on the force with which the accelerator pedal is depressed in a step S4. The force with which the accelerator pedal is depressed is detected by the accelerator operation detector 9.

The torque current command unit 7 calculates a torque current command value corresponding to the force with which the accelerator pedal is depressed, and controls the torque current so as to be of the calculated command value in a step S4. The electric motor 3 now generates a torque that is determined by the product of the exciting current and the torque current depending on the force with which the accelerator pedal is depressed.

If the accelerator pedal is released, then the torque current command unit 7 determines whether the vehicle speed detected by the vehicle speed detector 8 is lower than a predetermined creep speed or not in a step S5. If the detected vehicle speed is lower than the creep speed, then the torque current command unit 7 calculates a torque current command value to enter a creep mode in a step S6. In the creep mode, the torque current command unit 7 controls the torque current so as to be of the calculated command value.

The electric motor 3 now generates a torque that is determined by the product of the exciting current and the torque current depending on the creep speed.

In the creep mode, the electric vehicle is subject to a small torque and creeps.

The above control sequence is carried out after it is found that the detected shift position is the D position in the step S1. However, the same control sequence is effected after it is found that the detected shift position is the R position in the step S1.

If the D position is divided in a number of subpositions, then control goes to the step S2 after it is found that the detected shift position is any of the subpositions of the D position.

While the electric motor 3 has been described as comprising a three-phase AC induction motor, it may be a DC brushless motor.

As described above, insofar as the accelerator pedal is not depressed, the brake is not applied, the transmission is in the D or R position, and the vehicle speed is lower than the creep speed, then a low torque current command value is supplied from the torque current command unit 7 to the inverter 4.

Therefore, the electric vehicle is allowed to creep due to a small torque produced in the D position, for example. Even when a driver who is used to a motor vehicle propelled by an internal combustion engine combined with an automatic transmission drives the electric vehicle, the driver can easily maneuver the electric vehicle, e.g., can put the electric vehicle into a garage or pull over to park the electric vehicle with ease.

Furthermore, since the electric motor 3 is not energized as long as the brake is applied, the energy consumption by the electric vehicle is minimized.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A device for generating false creep for an electric vehicle equipped with a transmission, comprising:
   an electric motor for propelling the electric vehicle;
   drive control means for converting a DC voltage from a battery to control said electric motor;
   shift position detecting means for detecting whether the transmission is in a shift position to move the electric vehicle;
   a controller for applying a control signal to said drive control means when the transmission is in the shift position to move the electric vehicle;
   accelerator operation detecting means for detecting whether an accelerator pedal of the electric vehicle is depressed or not;
   vehicle speed detecting means for detecting a speed of travel of the electric vehicle;

brake operation detecting means for detecting whether a brake is being applied to the electric vehicle or not; and torque command means for outputting a low torque command value to said drive control means when the accelerator pedal is not depressed, the brake is not applied, the transmission is in the shift position to move the electric vehicle, and the speed of travel of the electric vehicle is lower than a predetermined creep speed.

2. A device according to claim 1, wherein said shift position is a drive position or a reverse position.

3. A device according to claim 1, wherein said torque controller means comprises means for outputting no control signal when the brake is applied.

4. A device for generating false creep for an electric vehicle equipped with a transmission, comprising:

an electric motor for propelling the electric vehicle;

shift position detecting means for detecting whether the transmission is in a shift position to move the electric vehicle;

accelerator operation detecting means for detecting whether an accelerator pedal of the electric vehicle is depressed or not;

vehicle speed detecting means for detecting a speed of travel of the electric vehicle;

brake operation detecting means for detecting whether brake is applied to the electric vehicle or not; and control means for outputting a relatively low current to said electric motor when the accelerator pedal is not depressed, the brake is not applied, the transmission is in the shift position to move the electric vehicle, and the speed of travel of the electric vehicle is lower than a predetermined creep speed.

5. A device according to claim 4, wherein said shift position is a drive position or a reverse position.

6. A device according to claim 4, wherein said control means comprises means for outputting no current to said electric motor when the brake is applied.

7. A device for generating false creep for an electric vehicle equipped with a transmission, an electric motor for propelling the vehicle through the transmission, and control means for controlling a drive torque produced by the electric motor, an improvement comprising, means for determining vehicle speed and when both an accelerator pedal for operating the control means is released and the transmission is in a selected position to move the vehicle, said means for determining then causing the control means to control the electric motor to produce a small drive torque for vehicle creeping if the vehicle speed is below a predetermined amount.

8. A device according to claim 7, wherein means are provided for detecting that a vehicle brake is being applied and causing the control means to terminate said small drive torque produced by the electric motor.

* * * * *